United States Patent Office 2,785,181
Patented Mar. 12, 1957

2,785,181

SUBSTITUTED AMINOPYRROLECARBOXYLIC ACIDS AND ESTERS

Coy W. Waller, Nanuet, N. Y., and Martin J. Weiss, Highland Park, and John S. Webb, Warren Township, Somerset County, N. J., assignors to American Cyanamid Company, New York, N. Y., a corporation of Maine No Drawing. Application April 19, 1954,
Serial No. 424,264

8 Claims. (Cl. 260—326.3)

This invention relates to new organic compounds. More particularly, it relates to substituted aminopyrroles and their preparation.

For many years a study of pyrrole chemistry has been carried out by numerous investigators because of the presence of this heterocyclic nucleus in the structures of haemoglobin and chlorophyll. During the course of this work many pyrrole compounds have been described bearing various substituents. However, the present compounds, 1 - alkyl-4-substituted amino-2-pyrrolecarboxylic acids and esters, have not been described.

The compounds of the present invention may be illustrated by the following structural formula:

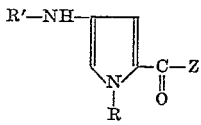

in which R is an alkyl radical, R' is an amidino, amidinoamidino, aminoacetimidoyl, thiocarbamoyl, S-alkylisothiocarbamoyl, alkyl, nitroaryl, carbobenzoxy or aryl sulfonyl radical and Z is a hydroxyl or alkoxyl radical. Since many of these compounds contain both amino and carboxylic acid radicals, obviously they form salts and esters which are intended to be included within the scope of this invention.

The compounds of the present invention are, in general, crystalline solids with relatively high melting points. They are soluble in the usual organic solvents such as alcohol, pyridine, dimethylformamide etc. In the form of their salts they are water soluble.

These compounds can be prepared by different methods. One method is by reduction of the corresponding nitro compounds described and claimed in our copending applications, Serial Numbers 424,261 and 424,263, both filed April 19, 1954.

We have found that compounds of the following structure have antibacterial properties.

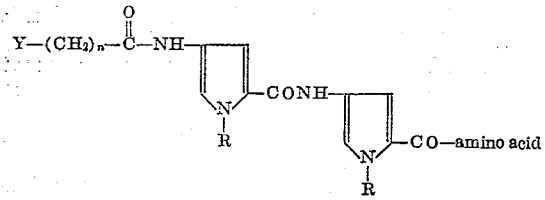

where Y is amino or substituted amino and $n$ is a small whole integer as, for example, the compound beta-[1-methyl-4-(4-guanidinoacetamido-1-methyl - 2 - pyrrolecarboxamido) - 2 - pyrrolecarboxamide]propionamide has antibacterial activity against a number of Gram-positive and Gram-negative bacteria, and activity against equine encephalomyelitis virus. The compounds of the present invention are useful as intermediates for the synthesis of antibacterial substances. The compounds also show analgesic activity.

EXAMPLE 1

4-benzenesulfonamido-1-methyl-2-pyrrolecarboxylic acid

Sodium methylate (140 parts) is dissolved in ethanol (1120 parts), the solution is cooled to 25° C., ethyl 4-nitro-2-pyrrolecarboxylate (402 parts) is added and then methyliodide (1070 parts) is added. Within a short time heat is evolved and it is necessary to periodically cool the solution in an ice bath to keep the temperature below 40° C. Crystalline solids begin to precipitate and the reaction mixture is allowed to set overnight at room temperature. After chilling and filtering, the collected solids are washed thoroughly with water to remove much of the color. After drying to constant weight in the oven at 55° C., 384 parts (89%) of ethyl 1-methyl-4-nitro-2-pyrrolecarboxylate is obtained as light tan colored platelets, melting at 108°–112° C. Several recrystallizations from ethanol and treatment with activated charcoal give white platelets, melting at 113.2°–114.2° C. Additional crude material may be obtained by diluting the original mother liquor with water.

To a hot solution of sodium hydroxide (200 parts) in water (800 parts) a suspension of ethyl 1-methyl-4-nitro-2-pyrrolecarboxylate (364 parts) in hot ethanol (640 parts) is added. The yellow solid which forms is dissolved by heating the solvent to reflux and adding water (200 parts). Refluxing is continued for four and one-half hours. After then standing overnight at room temperature, coarse yellow crystals form. These are dissolved by the addition of hot water (2000 parts) and then this solution is acidified with excess 6N hydrochloric acid. The suspension is chilled and the crystalline solids are filtered. After drying in the oven at 55° C., to constant weight, 257 parts (82%) of 1-methyl-4-nitro-2-pyrrolecarboxylic acid, melting point 194°–197° C., are obtained. Several recrystallizations from ethanol and from mixtures of ethanol with water and one treatment with activated charcoal give white crystals, melting at 195°–197° C.

1-methyl-4-nitro-2-pyrrolecarboxylic acid (5.0 parts) is hydrogenated with 10% palladium-carbon catalyst (1.5 parts) in ethanol (100 parts) in the Parr low pressure hydrogenation apparatus. The hydrogen uptake is rapid. The hydrogenation flask is flushed with nitrogen and the catalyst is filtered in a nitrogen atmosphere; concentrated sulfuric acid (1.08 parts), is then added dropwise to the chilled filtrate. This gives a white crystalline material which is filtered and air dried to yield 2.5 parts of 4-amino-1-methyl - 2 - pyrrolecarboxylic acid .1/2H$_2$SO$_4$, melting at 165°–167° C. with gas evolution, resolidifying and then remelting at 195° C. A sample of the sulfate salt is purified by two recrystallizations from ethanol-water and once from hot water to give, after drying under reduced pressure over phosphorus pentoxide at room temperature, the hemi-hydrate, melting at 196°–197° C.

Five parts of 4-amino-1-methyl-2-pyrrolecarboxylic acid sulfate is dissolved in 150 parts of water and 3.8 parts of barium hydroxide in 50 parts of water is added. It is centrifuged and the supernatant is evaporated to dryness using a Megavac pump with a Dry Ice trap condenser. The residue is dissolved in 300 parts of boiling methanol under nitrogen, filtered and concentrated to 50 parts by volume under reduced pressure. The product crystallizes on cooling overnight. The crystals are filtered and washed with ethanol and ether, and dried at 78° C. in the vacuum drier; yield, 1.6 parts melting point 154°–155° C. with gas evolution.

A mixture of 8 parts of 4-amino-1-methyl-2-pyrrolecarboxylic acid, 160 parts of ethanol, 200 parts of water, 42 parts of 5N sodium hydroxide and 14 parts of benzenesulfonyl chloride is heated in a steam bath until solution is complete. The solution is cooled and acidified (to pH 1) with concentrated hydrochloric acid. The product, 9.85 parts, is isolated after cooling (5° C.) overnight. It is purified by dissolving in dilute sodium hydroxide solution, clarifying with charcoal and precipitating by acidification. It melts at 182.5° C. with evolution of a gas.

EXAMPLE 2

*4-ureido-1-methyl-2-pyrrolecarboxylic acid*

A solution of 5 parts 4-amino-1-methyl-2-pyrrolecarboxylic acid sulfate in 50 parts of water is reacted with about 5 parts of solid potassium cyanate. The reaction mixture is acidified with hydrochloric acid and after one-half hour the precipitate is filtered. This is dissolved in ethanol, filtered and high boiling petroleum ether added to induce crystallization. The product is obtained as white crystals, melting point 189°–190° C. with gas evolution.

EXAMPLE 3

*4-(2,4-dinitrophenyl) - amino - 1 - methyl - 2 - pyrrolecarboxylic acid*

A solution of 2 parts of 4-amino-1-methyl-2-pyrrolecarboxylic acid sulfate in 50 parts of saturated sodium bicarbonate solution is reacted with 5 parts of 2,4-dinitrofluorobenzene in 160 parts of ethanol with stirring for two hours. The reaction mixture is then diluted with an equal volume of water and extracted twice with equal volumes of ether. The water phase is then acidified with hydrochloric acid and the dark red crystalline product filtered, washed with water and air dried. Yield 2.2 parts, melting point 229° C.

Ultraviolet absorption:
0.1 N NaOH 258, 14,700; 360, 14,200.
0.1 N HCl 240, 18,800; 358, 14,900.

EXAMPLE 4

*4 - carbobenzoxyamido-1-methyl-2-pyrrolecarboxylic acid*

Carbobenzoxychloride (6.1 parts) is added dropwise simultaneously with an 0.1N sodium hydroxide solution (27 parts) to a chilled solution of 4-amino-1-methyl-2-pyrrolecarboxylic acid .1/2H$_2$SO$_4$ (5 parts) in 0.1N sodium hydroxide solution (53 parts). The solution is stirred for a few minutes and a small amount of insoluble solid is filtered off. The filtrate is acidified to Congo Red test paper with concentrated hydrochloric acid solution. After chilling and scratching a crystalline solid forms. This is filtered and air dried to give 3 parts of 4-carbobenzoxyamido-1-methyl-2-pyrrolecarboxylic acid, melting at 138°–141° C. with gas evolution.

EXAMPLE 5

*Ethyl 4 - (N - amidinoguanidino)-1-methyl-2-pyrrolecarboxylate*

A solution of ethyl 1-methyl-4-nitro-2-pyrrolecarboxylate (15 parts) in ethanol (200 parts) is hydrogenated with 10% palladium on carbon (4 parts) as catalyst in a Parr low pressure apparatus. The hydrogen uptake is rapid and essentially quantitative. The catalyst is filtered and to the almost colorless filtrate is added concentrated sulfuric acid (3.78 parts). The suspension is chilled and the white crystalline precipitate is filtered, washed with ether and air dried to give 14.8 parts (91%) of ethyl 4-amino-1-methyl-2-pyrrolecarboxylate .1/2H$_2$SO$_4$, melting with decomposition at 179° C. Several recrystallizations from ethanol-water gives a sesqui-hydrate, melting at 185° C. with decomposition.

Ethyl 4-amino-1-methyl-2-pyrrolecarboxylate sulfate hydrate, 23 parts, dicyandiamide, 9 parts, and water, 50 parts, are refluxed together for 30 minutes. The resulting clear reaction mixture is then cooled and made alkaline by the addition of dilute sodium hydroxide. The pinkish oil which forms is separated from the aqueous layer and caused to crystallize by trituration with alcohol. The pink, crystalline powder thus obtained is washed well with water and dried to yield 10 parts of ethyl 4-(N-amidinoguanidino)-1-methyl-2-pyrrolecarboxylate with a melting point of 173°–175° C. (decomposition). The product is purified by recrystallization from dilute alcohol with the aid of decolorizing carbon to give light tan crystals with a melting point of 175°–176° C. (decomposition).

EXAMPLE 6

*Ethyl 1-methyl-4-thioureido-2-pyrrolecarboxylate*

Ethyl 4-amino-1-methyl - 2 - pyrrolecarboxylate hemisulfate hydrate, 44 parts, ammonium thiocyanate, 20 parts, and water, 30 parts, are heated together on a steam bath until a dry residue is obtained. This residue is then ground with water, 25 parts. The insoluble material is filtered off and dried to give 35 parts of crude product which has a melting range of 195°–200° C. (with decomposition). The crude product is purified by recrystallization from a large volume of alcohol to give large, almost white irregular plate-like crystals which have a melting point 228° C. with decomposition.

EXAMPLE 7

*Ethyl-1-methyl-4-(S - methylisothioureido)-2-pyrrolecarboxylate hydroiodide*

Crude ethyl 1-methyl-4-thioureido-2-pyrrolecarboxylate, 35 parts, methyl iodide, 26 parts, and ethanol, 280 parts, are refluxed together for one hour. Evaporation of the alcohol leaves a yellow, crystalline residue of crude product, 43 parts. This material has a melting range of 186°–195° C. and is water soluble. A water solution of this salt when treated with dilute ammonium hydroxide gives the base which has a melting range of 126°–128° C.

EXAMPLE 8

*Ethyl 4-guanidino-1-methyl-2-pyrrolecarboxylate nitrate*

Ethyl 1 - methyl-4-(S-methylisothioureido)-2-pyrrolecarboxylate hydroiodide, 20 parts, is refluxed in absolute alcohol, 160 parts. A slow stream of anhydrous ammonia is passed through the refluxing solution until the evolution of methyl mercaptan ceases. The reaction mixture is then evaporated to dryness. The resulting residue, 17 parts, is dissolved in water, 150 parts, cooled in an ice bath and dilute nitric acid added until precipitation of the crude product is complete. The crude material is purified by recrystallization from water to give eight parts of pure product having a melting point of 244° C. (with decomposition).

EXAMPLE 9

*N-(2-carbethoxy-1-methylpyrrolyl-4-)amidinomethylmethylpentamethyleneammonium iodide*

Cyanomethylmethylpentamethyleneammonium iodide (33.5 parts) is added to an ethanolic solution (200 parts) of ethyl 4-amino-1-methyl-2-pyrrolecarboxylate, prepared by catalytic hydrogenation of the corresponding nitro compound (25 parts). Additional absolute ethanol (80 parts) is added and the suspension is heated to reflux to give complete solution. After refluxing for seventy hours, the blood red solution is concentrated by distillation to about 130 parts by volume. This residual solution is chilled and seeded to give a heavy crop of sandlike crystals which are collected and washed with methylethyl ketone (20 parts) to very effectively remove colored impurities. After air drying, 41 parts of N-(2-carbethoxy - 1 - methylpyrrolyl-4)amidinomethylmethylpentamethylene ammonium iodide, melting at 134°–136° C., are obtained. Several recrystallizations from ethanol and from mixtures of ethanol with methylethyl ketone gives white crystals which slowly melt and decompose from 133° C. to 151° C.

EXAMPLE 10

*Ethyl 4-(2-aminoacetimidoylamino)-1-methyl-2-pyrrole-carboxylate dihydrobromide*

Twenty-six parts of ethyl 1-methyl-4-amino-2-pyrrole-carboxylate dissolved in 220 parts of dimethylformamide is added to a suspension of 40 parts of methyl alpha-carbobenzyloxyamino-acetthioimidate (prepared by the action of methyl mercaptan and dry hydrochloric acid upon alpha-carbobenzyloxyaminoacetonitrile in ether) in 250 parts of dimethylformamide. After a few minutes of shaking at room temperature, a clear solution results and an odor of methyl mercaptan is evident. The reaction mixture is allowed to stand at room temperature for 25 hours and is then poured into 5000 parts of diethyl ether. The white precipitate formed is filtered off, washed with diethyl ether and dried under reduced pressure. The yield of ethyl 4-(2-carbobenzyloxyamino-acetimidoylamino)-1-methyl-2-pyrrolecarboxylate hydrochloride is 35 parts; melting point, 154°–156° C.

Thirty parts of finely ground ethyl 4-(2-carbobenzyloxyaminoacetimidoylamino)-1-methyl-2-pyrrolecarboxylate hydrochloride is added to 250 parts of a 30% solution of hydrobromic acid in glacial acetic acid. A clear solution is soon obtained. On standing a few minutes, gas evolution is noted and a white precipitate commences to separate from the solution. After one and one-half hours, the reaction mixture is poured into 2500 parts of diethyl ether, and the mixture allowed to stand at room temperature overnight. The precipitate is then filtered off, washed with diethyl ether and dried under reduced pressure over solid sodium hydroxide. The yield of ethyl 4-(2-aminoacetimidoylamino)-1-methyl-2-pyrrolecarboxylate dihydrobromide is twenty-five parts; melting point 265°–267° C. with decomposition.

We claim:

1. Compounds of the group having the general formula:

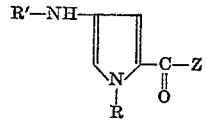

in which R is a lower alkyl radical, R' is a member of the group consisting of amidino, amidinoamidino, aminoacetimidoyl, thiocarbamoyl, S-lower alkylisothiocarbamoyl, carbamoyl, carbobenzoxy, nitrophenyl, and phenylsulfonyl radicals and Z is a member of the group consisting of hydroxyl and alkoxyl radicals.

2. An ethyl 1-lower alkyl 4-aminoacetimidoylamino-2-pyrrolecarboxylate.

3. A lower alkyl ester of 1-methyl 4-aminoacetimidoylamino-2-pyrrolecarboxylic acid.

4. Ethyl 4-guanidino-1-methyl-2-pyrrolecarboxylate.

5. 4-ureido-1-methylpyrrole-2-carboxylic acid.

6. Ethyl 1-methyl-4-aminoacetimidoylamino-2-pyrrolecarboxylate.

7. 4-carbobenzoxyamido-1-methyl-2-pyrrolecarboxylic acid.

8. Ethyl 4-(N-amidinoguanidino)-1-methyl-2-pyrrolecarboxylate.

References Cited in the file of this patent

J. Am. Chem. Soc., vol. 37, pp. 2538–50 (1915).
J. Am. Chem. Soc., vol. 53, p. 188 (1931).
Ber. Deut. Chem. Ges., vol. 55, p. 1950 (1922).
C. A. 41, 1278 (1947), citing Am. Jr. Boton., vol. 33, pp. 638–47 (1946).